(12) United States Patent
Taglione

(10) Patent No.: US 10,841,489 B2
(45) Date of Patent: Nov. 17, 2020

(54) SCENE RECONSTRUCTION BY ASSEMBLING IMAGES

(71) Applicant: AREVA NP, Courbevoie (FR)

(72) Inventor: Matthieu Taglione, Dijon (FR)

(73) Assignee: AREVA NP, Courbevoie (FR)

( * ) Notice: Subject to any disclaimer, the term of this patent is extended or adjusted under 35 U.S.C. 154(b) by 12 days.

(21) Appl. No.: 15/543,998

(22) PCT Filed: Jan. 11, 2016

(86) PCT No.: PCT/EP2016/050377
§ 371 (c)(1),
(2) Date: Jul. 15, 2017

(87) PCT Pub. No.: WO2016/113219
PCT Pub. Date: Jul. 21, 2016

(65) Prior Publication Data
US 2018/0013952 A1    Jan. 11, 2018

(30) Foreign Application Priority Data
Jan. 16, 2015  (FR) ..................... 15 50371

(51) Int. Cl.
*H04N 5/232* (2006.01)
*H04N 1/387* (2006.01)
(Continued)

(52) U.S. Cl.
CPC ..... *H04N 5/23238* (2013.01); *G01N 21/8851* (2013.01); *G06T 11/60* (2013.01); *H04N 1/3876* (2013.01)

(58) Field of Classification Search
None
See application file for complete search history.

(56) References Cited

U.S. PATENT DOCUMENTS 4,485,409 A * 11/1984 Schumacher ........... G06F 3/005
348/218.1
6,133,943 A * 10/2000 Needham ............. G06T 3/4038
348/37
(Continued)

FOREIGN PATENT DOCUMENTS

CN        103927731 A     7/2014
DE        19739250    *   3/1998  ........... G01B 11/303
(Continued)

OTHER PUBLICATIONS

Search Report of PCT International Phase.

*Primary Examiner* — Hung Q Dang
(74) *Attorney, Agent, or Firm* — Davidson, Davidson & Kappel, LLC

(57) ABSTRACT

A method for inspecting a surface (12) of a piece of nuclear power plant equipment includes scanning the surface (12) with an acquisition field (20) of a matrix array camera (14). The acquisition field (20) moves relative to the surface (12) at a movement speed. The method also includes acquiring, by means of the matrix array camera (14), an image (22) of the acquisition field (20), with a certain acquisition frequency. Each image (22) includes a first number of lines of pixels. The method also includes extracting, from each image (22), a first set of lines, the first set comprising a second number of continuous lines of pixels, the second number being between 2 and the first number; and constituting a final image (32) of the surface (12) by juxtaposing the lines extracted from each image (22). The movement speed, the acquisition frequency, the first number of lines and the second number of lines are chosen such that the final image (32) covers the entire surface (12) without interruption.

12 Claims, 2 Drawing Sheets

(51) Int. Cl.
*G01N 21/88* (2006.01)
*G06T 11/60* (2006.01)

(56) References Cited

U.S. PATENT DOCUMENTS

| | | | |
|---|---|---|---|
| 6,236,811 B1* | 5/2001 | Clark | H04N 1/195 |
| | | | 355/53 |
| 7,826,649 B2* | 11/2010 | Crandall | G02B 21/002 |
| | | | 382/128 |
| 8,976,242 B2 | 3/2015 | Aikawa et al. | |
| 2001/0019636 A1 | 9/2001 | Slatter | |
| 2005/0237631 A1* | 10/2005 | Shioya | H04N 5/23238 |
| | | | 359/770 |
| 2007/0153261 A1* | 7/2007 | Ersue | G01N 21/9515 |
| | | | 356/237.2 |
| 2010/0245813 A1* | 9/2010 | Margalit | G01N 21/956 |
| | | | 356/237.5 |
| 2010/0283847 A1* | 11/2010 | Aikawa | G01N 21/8803 |
| | | | 348/142 |
| 2010/0309308 A1* | 12/2010 | Saphier | G06T 7/0004 |
| | | | 348/92 |
| 2013/0155499 A1* | 6/2013 | Dixon | G02B 21/002 |
| | | | 359/385 |
| 2013/0242137 A1* | 9/2013 | Kirkland | G03B 17/561 |
| | | | 348/231.99 |
| 2014/0104468 A1* | 4/2014 | Parker | H04N 5/37213 |
| | | | 348/295 |
| 2015/0145983 A1* | 5/2015 | Akashi | G02B 7/008 |
| | | | 348/80 |
| 2016/0148073 A1* | 5/2016 | Uffenkamp | G06T 3/4038 |
| | | | 348/148 |

FOREIGN PATENT DOCUMENTS

| | | |
|---|---|---|
| EP | 1530360 A2 | 5/2005 |
| JP | H11326580 A | 11/1999 |
| JP | 2005030961 A | 2/2005 |

* cited by examiner

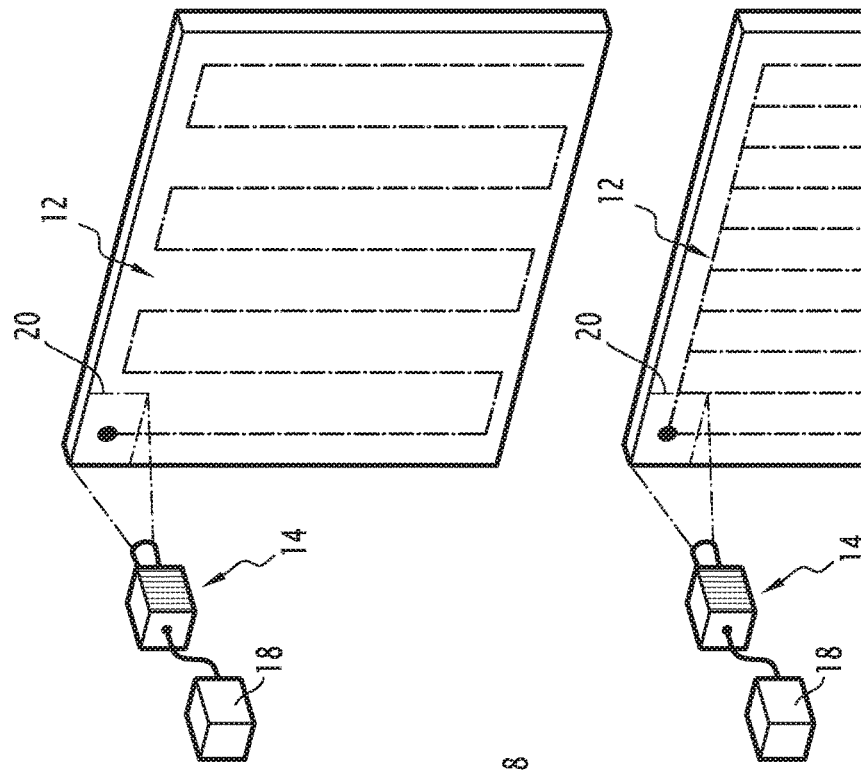
FIG.3
FIG.4
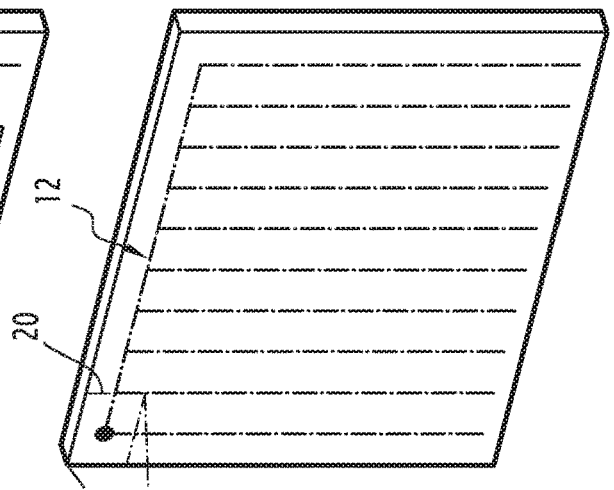
FIG.2
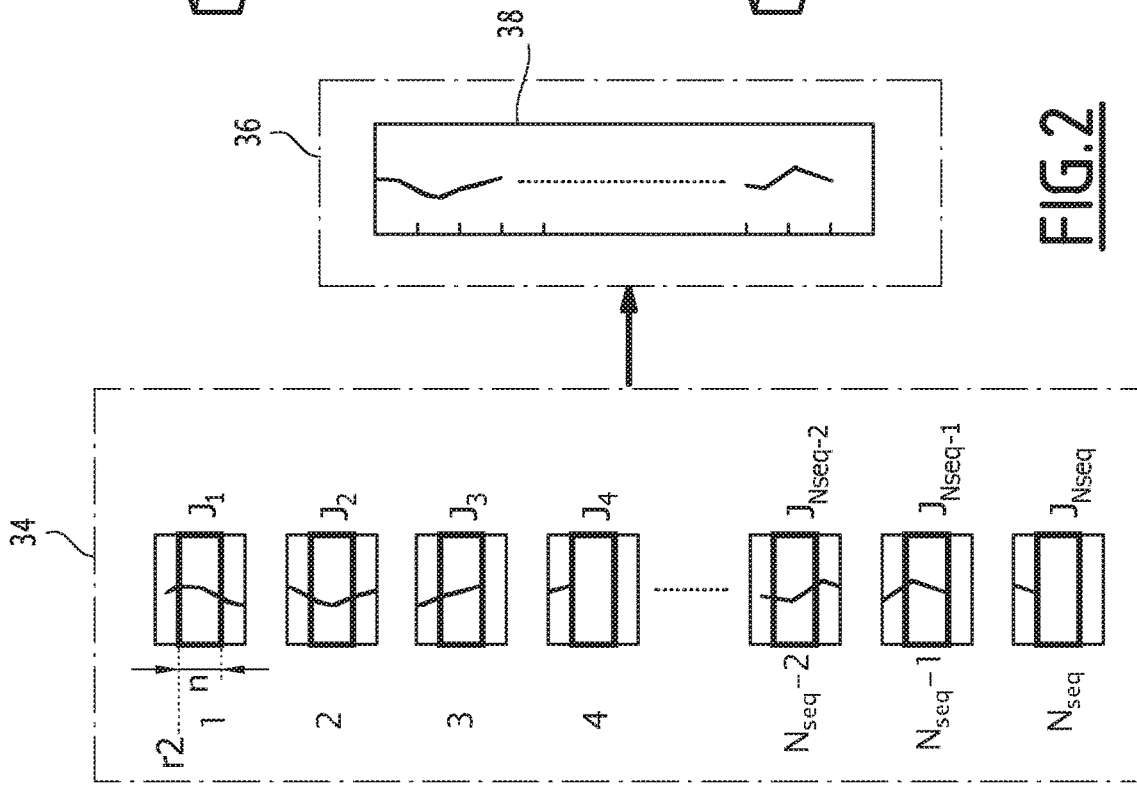

SCENE RECONSTRUCTION BY ASSEMBLING IMAGES

The present invention relates to a method for inspecting a surface of a piece of nuclear power plant equipment.

The invention also relates to a device for inspecting a surface of a piece of nuclear power plant equipment making it possible to carry out such a method.

BACKGROUND

Methods of the aforementioned type are known, in particular from document US 2010/0129059. The method describes a reconstruction of an image of the surface from a video to facilitate the inspection of a nuclear vessel.

However, the method uses the principle of fiducial points, i.e., easily recognizable points, which are identified to make it possible to reconstruct the image. The processing of the image is therefore complex with this method.

Another solution consists of using a linear sensor that is scanned in front of the surface to be analyzed, like in WO 2013/007951 to inspect packages. However, this method is time-consuming for large surfaces, since a single line is acquired per shot. Furthermore, the linear sensors commercially available at this time are very bulky, and it is therefore impossible to inspect surfaces in small spaces using this method.

SUMMARY OF THE INVENTION

One aim of the invention is therefore to provide a quick and easy method making it possible to inspect a surface of a piece of nuclear power plant equipment.

To that end, a method of the aforementioned type is provided, comprising the following steps:
- scanning the surface with an acquisition field of a matrix array camera, the acquisition field moving relative to the surface at a movement speed;
- acquiring, by means of the matrix array camera, an image of the acquisition field, with a certain acquisition frequency, each image including a first number of lines of pixels;
- extracting, from each image, a first set of lines, the first set comprising a second number of continuous lines of pixels, the second number being between 2 and the first number;
- constituting a final image of the surface by juxtaposing the lines extracted from each image, the movement speed, the acquisition frequency, the first number of lines and the second number of lines being chosen such that the final image covers the entire surface without interruption.

Using a matrix array camera makes it possible to acquire several lines at once, which allows faster acquisition. For an inspection with a duration equal to that done with a linear sensor, the movement speed is therefore lower and the image is thus more precise.

According to specific embodiments of the invention, the method has one or more of the following features, considered alone or according to any technically possible combination(s):
- the method further comprises a step for searching for indications present on the surface in the final image of the surface,
- during the method, the acquisition field moves relative to the nuclear power plant, such that the surface to be inspected is immobile relative to the nuclear power plant,
- the extracted lines are adjacent,
- the method also comprises the following steps:
    - extracting, from each image, a second set of lines, the second set comprising a second number of continuous lines of pixels, such that the lines of the second set are different from the lines of the first set,
    - constituting a second final image of the surface by juxtaposing the second sets of lines extracted from each image,
- the acquisition frequency is comprised between 0.1 Hz and 10 kHz,
- the acquisition field of the camera moves relative to the surface to be analyzed at a speed comprised between 0.1 and 2 mm/s,
- the second number of lines is comprised between 2 and the first number of lines,
- the acquisition field of the camera moves:
    - from top to bottom relative to the surface to be analyzed with image acquisition,
    - once at the bottom of the surface, to the left or to the right without image acquisition,
    - then from bottom to top to the top of the surface to be analyzed with image acquisition,
    - then to the same side as before without image acquisition,
- the method being reiterated until the entire surface to be analyzed has been acquired; and
- the acquisition field of the camera moves:
    - from top to bottom relative to the surface to be analyzed with image acquisition,
    - and once at the bottom of the surface, from bottom to top up to the top of the surface to be analyzed without image acquisition and to the left or to the right,
- the method being reiterated until the entire surface to be analyzed has been acquired; and
- the surface to be analyzed is the inside and/or the outside of the vessel bottom penetrations of a steam generator, the coating of the vessel, the cover of the vessel or any other pressurized nuclear power plant equipment, during its manufacture or maintenance.

A device for inspecting a surface of a piece of nuclear power plant equipment is also provided, comprising a matrix array camera, having an acquisition field, and a device scanning the surface with the acquisition field of the camera at a movement speed, the inspection device comprising a computer programmed to:
- acquiring, by means of the matrix array camera, an image of the acquisition field, with a certain acquisition frequency, each image including a first number of lines of pixels,
- extracting, from each image, a first set of lines, the first set comprising a second number of continuous lines of pixels, the second number being between 2 and the first number, and
- constituting a final image of the surface by juxtaposing the lines extracted from each image, the movement speed, the acquisition frequency, the first number of lines and the second number of lines being chosen such that the final image covers the entire surface without interruption.

BRIEF SUMMARY OF THE DRAWINGS

Other features and advantages of the invention will appear upon reading the following description, provided solely as an example and done in reference to the appended drawings, in which:

FIG. 2 is a schematic view of certain steps of another embodiment of the method according to the invention, FIGS. 3 and 4 are diagrams of the scanning movement of the acquisition field of the camera according to different embodiments.

DETAILED DESCRIPTION

Figure 1:
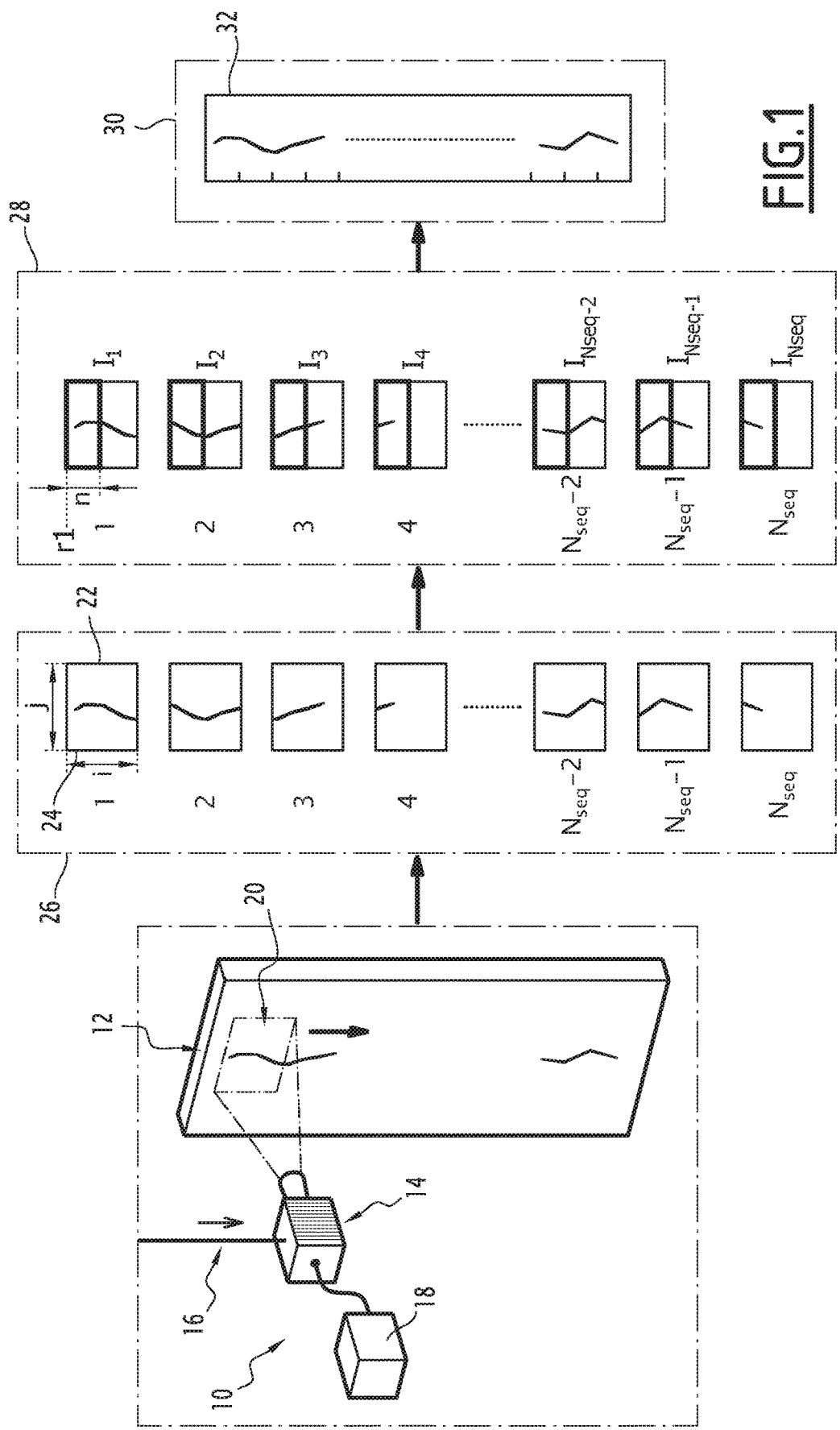
FIG. 1 is a schematic view of the steps of one embodiment of the method according to the invention.

A device 10 for inspecting a surface to be analyzed 12 of a piece of nuclear power plant equipment is shown in FIG. 1. It in particular includes a matrix array camera 14, a scanning device 16 and a computer 18.

The surface 12 is for example all or part of the inner surface of the vessel bottom penetrations, all or part of the outer surface of the vessel bottom penetrations, all or part of the coating of the vessel, all or part of the cover of the vessel, all or part of the inner and/or outer surface of a tube of a steam generator or any other pressurized piece of equipment of the nuclear power plant. The nuclear power plant is for example being manufactured or undergoing maintenance.

The matrix array camera 14 has an acquisition field 20 and is able to acquire several images 22 of part of the surface 12 coinciding with the field 20.

The image 22 acquired by the camera is made up of a matrix of pixels with size i*j, with i the number of horizontal lines and j the number of vertical lines of the matrix, with i strictly greater than 1. The pixel is for example a rectangle with size denoted h*L, with h being its height and L being its width. The height h can be equal to the width L. The rank refers to the numbering of the horizontal lines from top to bottom, with the top line 24 numbered 1.

The scanning device 16 is connected to the camera 14 and makes it possible to scan the acquisition field 20 of the camera 14 along the surface following an inspection plan. The acquisition field 20 moves relative to the nuclear power plant, such that the surface to be inspected 12 is immobile relative to the nuclear power plant. The camera 14 is for example moved at a given speed relative to the surface to be analyzed 12. In another alternative, the camera 14 remains immobile relative to the surface to be analyzed 12, and only its acquisition field 20 travels over the surface to be analyzed. In this case, the acquisition field 20 is for example moved using an inclinable mirror, the lens of the camera targeting the mirror at all times.

The speed of the acquisition field 20 relative to the surface to be analyzed 12 is subsequently denoted v. In one embodiment, the speed of the acquisition field is known precisely at all times. In another embodiment, the speed is not known precisely, but is situated in a known range of values.

In one embodiment, this speed is substantially constant during the scanning of the surface 12. According to one alternative, this speed is substantially constant, outside changes in direction and other movements of the acquisition field 20 relative to the surface to be analyzed 12 during which no image is interpreted. In another embodiment, the speed is variable, for example, if it is not necessary to dimension the indications of any flaws detected in the movement direction.

For the rest of the description, the acquisition field 20 moves relative to the surface to be analyzed 12 from the top of the surface to be analyzed 12 to the bottom thereof, at a substantially constant speed comprised between 0.1 and 2.0 mm/s. Any horizontal line is subsequently called a row, and any vertical line is called a column. It is, however, understood that the method described here applies to any horizontal or vertical movement, as well as any combination of the two, and that the notion of a line is both horizontal and vertical.

The acquisition field 20 here moves from top to bottom. Images are acquired at an acquisition frequency denoted f. Subsequently, f will be considered constant and comprised between 0.01 Hz and 10 kHz, for example between 1 and 100 Hz, and for example equal to 25 Hz. According to another alternative, the method may be suitable for operating with a non-constant f.

In reference to FIG. 1, we will now describe the method for reconstructing an image from a sequence of images using the computer 18.

The set of acquired images forms a sequence 26. The number of images in the sequence is denoted Nseq.

In step 28, a number n of lines is extracted from the first acquired image, forming a first set of lines 11. This number n is comprised between 2 and the number of lines of the acquired image, denoted i. Subsequently, these lines are considered to be continuous and situated one after the other, i.e., adjacent. Thus, n lines are extracted from the image going from rank r1 to rank r1+(n−1), with r1 having to be comprised between 1 and i−n+1, inclusive.

Next, from each acquired image, the lines situated at the same rank as before are extracted, i.e., the lines situated from rank r1 to rank r1+(n−1). The set of extracted lines forms sets I1, I2 ... $I_{Nseq}$.

In step 30, the sets of extracted lines I1, I2 ... $I_{Nseq}$ are juxtaposed to reconstruct a final image 32. The final image 32 for example has a resolution identical to those of the acquired images 22, i.e., its pixels also have size h*L.

In order for the final image 32 to cover the entire scanned surface without interruption, the parameters must be chosen such that: n=v/(f*h), with n the number of lines extracted per image, v the acquisition speed relative to the surface, f the acquisition frequency and h the height of a pixel (and consequently a line).

The final image 32 thus formed is a reconstruction of the entire surface scanned by the acquisition field 20, outside the r1−1 first lines and the i−r1+n−1 last lines.

According to one specific embodiment shown in FIG. 2, in step 34, n lines are extracted again, still continuous and adjacent here, from the first image of the sequence, forming a second set of lines J1. The extracted lines go from rank r2 to rank r2+(n−1), with r2 having to be comprised between 1 and i−n+1, inclusive, and such that the lines of the second set J1 are different from the lines of the first set I1.

Next, from each acquired image, the lines situated at the same rank as before are extracted, i.e., the lines situated from rank r2 to rank r2+(n−1). The set of extracted lines forms sets J1, J2 ... $J_{Nseq}$. Each set J1, J2 ... $J_{Nseq}$ is thus different from the associated set I1, I2 ... $I_{Nseq}$.

In step 36, the sets of extracted lines J1, J2 ... $J_{Nseq}$ are juxtaposed to reconstruct a second final image 38. The second final image 38 for example has an identical resolution to that of the first final image 32.

The final image 38 thus formed is a reconstruction of the entire surface scanned by the acquisition field 20, outside the r2−1 first lines and the i−r2+n−1 last lines.

The second final image 38 is different from the first final image 32, since each set is different. The second final image 38 represents the surface to be analyzed 12 with a slight shift, equal to |r1−r2|, relative to the first final image 32. The shot being different for the two images, this technique may make it possible to emphasize details, which are more or less visible according to various parameters, such as the shot angle or the lighting. This technique makes it possible to obtain two points of view from which it is for example possible to reconstruct a three-dimensional view of the surface to be analyzed 12.

Alternatively, the method is reiterated a desired number of times, making it possible to obtain this desired number of final images with different shots, on which the flaw indications are next detected.

To scan the entire surface to be analyzed 12, the entire method should be reiterated for the surface to be analyzed by scanning it with a series of vertical and/or horizontal movement.

FIGS. 3 and 4 show two possibilities for the scanning movement of the acquisition field 20 of the camera 14 relative to the surface to be analyzed 12. The depiction is planar, but the surface can be cylindrical or have a specific shape. The scanning movement is described according to a particular path, but it may be modified, for example by scanning the surface in the other direction, from right to left, or acquiring the images from bottom to top.

In FIG. 3, a movement in slots is shown.

The center of the acquisition field 20 of the camera is placed at an initial point 40. The left edge of the acquisition field 20 must be substantially at the left edge of the surface to be analyzed. The line with rank r1 or r2 of the acquisition field 20 must be substantially at the top edge of the surface to be analyzed.

The acquisition field 20 of the camera 14 is then moved from top to bottom at a constant speed, and the computer 18 acquires images. When the line with rank equal to r1+n−1 or r2+n−1 of the acquisition field 20 is substantially at the bottom edge of the surface to be analyzed, the computer 18 no longer acquires images, or these images will no longer be used during the processing of the sequence of images, and the acquisition field 20 is shifted from left to right relative to the surface by a distance equal to j*L, with j the number of columns of an image and L the width of a pixel, therefore of a column.

Then, the acquisition field 20 of the camera 14 is then moved from bottom to top at a constant speed, and the computer 18 acquires images again. When the center of the acquisition field 20 is substantially at the same height as the initial point 40, the computer 18 no longer acquires images, or these images will no longer be used during the processing of the sequence of images, and the acquisition field 20 is shifted from left to right relative to the surface by a distance equal to j*L, with j the number of columns of an image and L the width of a pixel.

The entire movement is repeated until the entire surface to be analyzed 12 has been scanned.

The method for reconstructing an image of the surface is first carried out for each acquisition sequence related to a same descent or a same rise of the acquisition field 20, and the set of images thus obtained is placed end to end from left to right to reform the full image.

In FIG. 4, a comb movement is shown.

The center of the acquisition field 20 of the camera is placed at an initial point 40, similar to that used for the slot movement.

The acquisition field 20 of the camera 14 is next moved from top to bottom at a constant speed, and the computer 18 acquires images. When the line with rank equal to r1+n−1 or r2+n−1 of the acquisition field 20 is substantially at the bottom edge of the surface to be analyzed, the computer 18 no longer acquires images, or these images will no longer be used during the processing of the sequence of images. The acquisition field 20 is then moved from bottom to top, such that its center is at the same height as the initial point 40, then the acquisition field 20 is shifted by a distance substantially equal to j*L to the right.

The entire movement is repeated until the entire surface to be analyzed 12 has been scanned.

The method for reconstructing an image of the surface is first carried out for each acquisition sequence related to a same descent of the acquisition field 20, and the set of images thus obtained is placed end to end from left to right to reform the full image.

Other possibilities for the scanning movement of the acquisition field 20 of the camera 14 over the surface 12 can be considered. For example, alternatively, in the case of a cylindrical element to be analyzed, the acquisition field 20 of the camera is moved helically over the surface 12. In some cases, this provides a final image that is distorted relative to reality, nevertheless making it possible to obtain information relative to the flaw indications.

Another possibility in the case of a cylindrical element to be analyzed consists of performing a revolution (inside or outside, depending on what is to be observed) around the cylindrical element, acquiring images of the surface of the cylindrical element and, after returning to a part of the surface that has already been acquired, moving along the axis of the cylindrical element and beginning again. When the acquisition field is such that the lines of the acquired image are along the axis of the cylindrical element, the columns are extracted from each image to construct a final image.

One thus obtains a final image of the entire surface to be analyzed 12. An operator can then easily look for indications of any flaws in the final image. If the operator only has a video of the set of acquired images, he must perform many back and forth journeys in the video to be able to view the complete flaw indications, since two adjacent zones are not necessarily acquired one after the other.

What is claimed is:

1. A method for inspecting a surface of a piece of nuclear power plant equipment, the method comprising the following steps:
scanning the surface with an acquisition field of a matrix array camera, the acquisition field moving relative to the surface at a movement speed;
acquiring, by the matrix array camera, an image of the acquisition field, with a certain acquisition frequency, each image including a first number of lines of pixels acquired at once;
extracting, from each image, a first set of lines, the first set comprising a second number of continuous lines of pixels, the second number being between 2 and the first number;
constituting a final image of the surface by juxtaposing, without overlapping, the lines extracted from each image, the movement speed, the acquisition frequency, the first number of lines and the second number of lines being chosen such that the final image covers an entirety of the surface without interruption;
extracting, from each image, a second set of lines, the second set comprising a third number of continuous lines of pixels, such that the lines of the second set are different from the lines of the first set; and
constituting a second final image of the surface by juxtaposing the second sets of lines extracted from each image.

2. The method according to claim 1, wherein each pixel has a height h, the movement speed v, the acquisition frequency f, the height h and the second number of lines n being such that $$n = \frac{v}{f * h}.$$

3. The method according to claim 1, wherein the method further comprises searching for indications present on the surface in the final image of the surface.

4. The method according to claim 1, wherein during the method, the acquisition field moves relative to the nuclear power plant, such that the surface to be inspected is immobile relative to the nuclear power plant.

5. The method according to claim 1, wherein the extracted lines are adjacent.

6. The method according to claim 1, wherein the third number of lines is comprised between 2 and the first number of lines.

7. The method according to claim 1, wherein the acquisition frequency is comprised between 0.1 Hz and 10 kHz.

8. The method according to claim 1, wherein the acquisition field of the camera moves relative to the surface to be analyzed at a speed comprised between 0.1 and 2 mm/s.

9. The method according to claim 1, wherein the acquisition field of the camera moves:
   from top to bottom relative to the surface to be analyzed with image acquisition,
   once at the bottom of the surface, to the left or to the right without image acquisition,
   then from bottom to top to the top of the surface to be analyzed with image acquisition,
   then to the same side as before without image acquisition,
   the method being reiterated until the entire surface to be analyzed has been acquired.

10. The method according to claim 1, wherein the acquisition field of the camera moves:
    from top to bottom relative to the surface to be analyzed with image acquisition,
    and once at the bottom of the surface, from bottom to top up to the top of the surface to be analyzed without image acquisition and to the left or to the right,
    the method being reiterated until the entire surface to be analyzed has been acquired.

11. The method according to claim 1, wherein the surface to be analyzed is the inside and/or the outside of the vessel bottom penetrations of a steam generator, the coating of the vessel, the cover of the vessel or any other pressurized nuclear power plant equipment, during a manufacture or a maintenance thereof.

12. The method according to claim 1 wherein the second number of continuous lines of pixels is less than the first number of lines of pixels.

* * * * *